United States Patent
Kokuzawa et al.

(10) Patent No.: US 7,369,311 B2
(45) Date of Patent: May 6, 2008

(54) LENS SHEETS FOR REAR PROJECTION SCREENS

(75) Inventors: Yukio Kokuzawa, Kanagawa (JP); Katsuyuki Murai, Kanagawa (JP); Shinpei Arita, Tochigi (JP)

(73) Assignees: Mitsubishi Gas Chemical Company Inc., Tokyo (JP); Japan Acryace Corporation, Tokyo (JP); Arisawa MFG. Co., Ltd., Joetsu-Shi, Nigata (JP)

( * ) Notice: Subject to any disclaimer, the term of this patent is extended or adjusted under 35 U.S.C. 154(b) by 180 days.

(21) Appl. No.: 11/103,458

(22) Filed: Apr. 12, 2005

(65) Prior Publication Data

US 2005/0225856 A1 Oct. 13, 2005

(30) Foreign Application Priority Data

Apr. 13, 2004 (JP) ............................. 2004-117852

(51) Int. Cl.
*G03B 21/60* (2006.01)
*G03B 21/56* (2006.01)

(52) U.S. Cl. ............... 359/457; 359/452; 359/456; 359/460

(58) Field of Classification Search ............... 359/452, 359/456, 460, 433, 457
See application file for complete search history.

(56) References Cited

U.S. PATENT DOCUMENTS 5,675,435 A * 10/1997 Ishii et al. .................. 359/460
6,088,158 A *  7/2000 Kimura ...................... 359/443

* cited by examiner

*Primary Examiner*—Diane I. Lee
*Assistant Examiner*—Magda Cruz
(74) *Attorney, Agent, or Firm*—Antonelli, Terry, Stout & Kraus, LLP.

(57) ABSTRACT

A lens sheet for use as a Fresnel lens sheet or a lenticular lens sheet of rear projection screens, which includes a plastic substrate and a lens element disposed on the plastic substrate. The plastic substrate includes at least a first surface layer, an intermediate layer and a second surface layer. Each of the first surface layer and the second surface layer has a saturated water absorptivity higher than that of the intermediate layer.

15 Claims, 2 Drawing Sheets

LENS SHEETS FOR REAR PROJECTION SCREENS

BACKGROUND OF THE INVENTION

1. Field of the Invention

The present invention relates to lens sheets for rear projection screens for use in rear projection television sets.

2. Description of the Prior Art

As shown in FIG. 1, the rear projection screen for use in a rear projection television set is a combination of, at least, a Fresnel lens sheet 1 disposed on the light source 5 side and a lenticular lens sheet 2 disposed on the watcher side, and further a front panel 3 further disposed adjacent to the lenticular lens sheet on the watcher side. A mirror 4 is further disposed to reflect light rays from the light source 5 to the rear projection screen. These sheets are mounted in a rear projection television set nearly in a close contact with each other. The Fresnel lens sheet and the lenticular lens sheet include diffusion elements, by which images are focused. Therefore, if the distance between the sheets is broadened for some kind of cause, projected images become blurred. The major cause of broadening the distance between the sheets is the warp or deflection of sheets due to the change in their water absorption depending on the change of ambient humidity.

To prevent such a disadvantage, there have been proposed various techniques for reducing the warp or deflection of the sheets caused by the change of ambient conditions. For example, JP 11-072848A proposes to make the surface layers of the front panel and the Fresnel lens sheet, each layer facing to the lenticular lens sheet, from a material having a larger water absorption than those of the opposite layers. JP 2000-214533A proposes to control the thickness of sheet, the degree of warp or deflection and the saturated water absorptivity. JP 2002-207253A proposes to form polycarbonate resin or MS resin (MMA-styrene copolymer resin) on both surfaces of a PMMA (polymethyl methacrylate) resin layer.

The proposed prior art techniques intend to reduce the warp or deflection of each sheet or a stack of sheets due to ambient humidity, by forming surface layers of Fresnel lens sheet and lenticular lens sheet from a low water-absorptive resin or by forming the surface layers of a stack of Fresnel lens sheet/lenticular lens sheet from a low water-absorptive resin. However, a single-layered sheet having a layer structure different in both surfaces, such as a sheet described in JP 11-72848A, is likely to undergo warp or deflection due to water absorption during its transportation because of its asymmetry. When both surface layers are made of a low water-absorptive resin and have a large thickness as described in JP 2002-207253A, the amount of antistatic agent to be added to the surface layers is increased. If the surface layers are thin, the water absorptivity of sheet is governed by that of the intermediate layer, to increase the degree of warp or deflection.

To reduce the warp or deflection of Fresnel lens sheet and lenticular lens sheet due to water absorption (moisture absorption), it is effective to reduce the water absorptivity of whole sheet. Generally, the Fresnel lens sheet is constituted from a plastic substrate and a Fresnel lens made of an ultraviolet cured resin, which is laminated to the surface of the substrate. The Fresnel lens is composed of a series of annular lens sections taken out of a simple lens which are concentrically arranged on a surface, and exhibits the same effects as those of a simple lens although having a smaller thickness. The Fresnel lens sheet is produced by applying an ultraviolet curable resin on the surface of the substrate, pressing a metal or resin mold having a shape matching with the contour of the Fresnel lens surface against the applied resin, and irradiating ultraviolet light from the side opposite to the mold to cure the resin into the Fresnel lens shape. The thickness of the plastic substrate is usually from 1.0 to 4.0 mm, and the thickness of the lens portion made of the ultraviolet cured resin is about 100 μm. The adhesion strength between the ultraviolet cured resin and the plastic substrate is important, because they may be separated from each other during the assembling into television sets, etc. if the adhesion strength is low. The main cause to reduce the adhesion strength can be the polarities of the raw materials themselves. Urethane-based resins and acrylate-based resins are widely used as the ultraviolet curable resins. If the plastic sheet contains a low polarity component such as styrene, the adhesion strength between the plastic sheet and the ultraviolet cured resin is reduced.

SUMMARY OF THE INVENTION

An object of the present invention is to solve the above problems in the prior arts and provide a method of effectively reducing the warp or deflection due to water absorption (moisture absorption).

As a result of extensive research in view of the above object, the inventors have found that the warp or deflection due to water absorption (moisture absorption) is reduced by a lens sheet having a specific layer structure.

Thus, the invention relates to a lens sheet for use in rear projection screen, which includes a plastic substrate and a lens element wherein the plastic substrate includes a first surface layer, an intermediate layer and a second surface layer, and a saturated water absorptivity of a resin which constitutes each of the first surface layer and the second surface layer is larger than that of a resin which constitutes the intermediate layer.

The invention further relates to a rear projection screen including the lens sheet mentioned above.

DETAILED DESCRIPTION OF THE INVENTION

Figure 1:
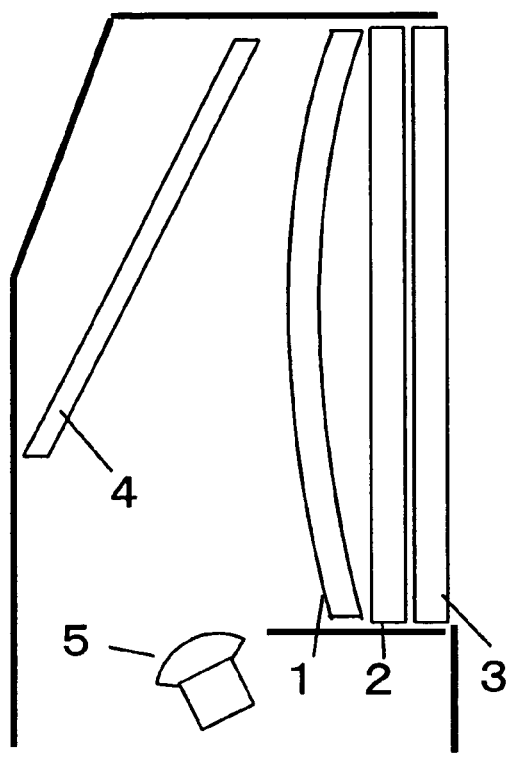
FIG. 1 is a schematic view illustrating the inside of a rear projection television set and the configuration of a screen disposed therein.
Figure 2:
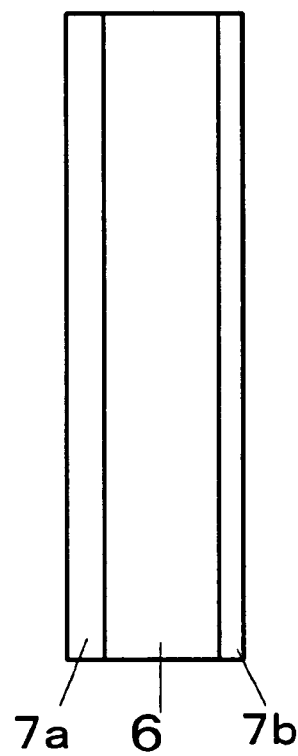
FIG. 2 is a schematic view showing a layer structure of a plastic substrate for use in a rear projection screen according to one aspect of the invention.

An example of the plastic substrate of the invention is shown in FIG. 2. An intermediate layer 6 is made of a low water-absorptive resin. The saturated water absorptivity of the resin for the intermediate layer is preferably less than 0.4% by weight (inclusive of zero). Examples of the resin having such a saturated water absorptivity include, but not limited to, methyl methacrylate-styrene copolymer resin (MMA-styrene copolymer resin) composed of 10 to 35% by weight of MMA and 90 to 65% by weight of styrene, acrylonitrile-styrene copolymer resin composed of 10 to 20% by weight of acrylonitrile and 90 to 80% by weight of styrene, and polycarbonates. The saturated water absorptivity of the intermediate layer is more preferably 0.3% by weight or less. The resins having such a saturated water absorptivity may be MMA-styrene copolymer resin composed of 10 to 30% by weight of MMA and 90 to 70% by weight of styrene. Since the degree of warp or deflection is lowered with decreasing water absorptivity, it is preferred that the saturated water absorptivity of the intermediate layer is lower than that of the surface layers described below by 0.05% by weight or more, and it is more preferred to be lower than 0.05 to 0.5% by weight. Polymethyl methacrylate (PMMA) is not suitable for the intermediate layer because of its high saturated water absorptivity, although its water absorptivity after immersion in water for 24 h is about 0.3% by weight.

First and second surface layers 7a, 7b are made of a resin having a relatively high water absorptivity to ensure a high adhesion strength with ultraviolet cured resin. The saturated water absorptivity thereof is preferably 0.4% by weight or more, more preferably 0.4 to 2.0% by weight. Examples of the resins meeting such a requirement include, but not limited to, MMA-styrene copolymer resin composed of 40 to 90% by weight of MMA and 60 to 10% by weight of styrene, acrylonitrile-styrene copolymer resin composed of 25 to 50% by weight of acrylonitrile and 75 to 50% by weight of styrene, and PMMA, with MMA-styrene copolymer resin composed of 60 to 80% by weight of MMA and 40 to 20% by weight of styrene, and acrylonitrile-styrene copolymer resin composed of 25 to 40% by weight of acrylonitrile and 75 to 60% by weight of styrene being more preferred.

The first surface layer and the second surface layer may be made of different resins and may have different saturated water absorptivities. In view of effectively reducing the warp and deflection, it is preferred to be made of the same resin and have substantially the same saturated water absorptivity.

Particularly preferred is a plastic substrate having an intermediate layer made of MMA-styrene copolymer resin composed of 10 to 30% by weight of MMA and 90 to 70% by weight of styrene, and first and second surface layers each made of the MMA-styrene copolymer resin composed of 60 to 80% by weight of MMA and 40 to 20% by weight of styrene.

To reduce the warp or deflection due to water absorption of the lens sheet such as Fresnel lens sheet or lenticular lens sheet, the thicknesses of each of the first and second surface layers and the intermediate layer are important. To reduce the warp or deflection due to water absorption, it is preferred to lower the water absorptivity of the whole lens sheet, this requiring to make the intermediate layer having a low water absorptivity thicker and the surface layers having a relatively high water absorptivity thinner. Reducing the thickness of the surface layers is also advantageous in view of production costs. Since an antistatic agent and other additives are required to be added to only the surface layers, the amount of such additives to be added is reduced by reducing the thickness of the surface layers. If the surface layers are unduly thin, the production stability during extrusion is poor and the appearance of the plastic substrate may be deteriorated. Therefore, the total thickness of the plastic substrate for use in the lens sheet is preferably from 1.0 to 4.0 mm, and the thickness of each surface layer is preferably from 50 to 300 μm. Although the first surface layer and the second surface layer may have different thicknesses, it is preferred to have the same thickness in view of effectively reducing the warp and deflection.

The plastic substrate may also contain light-diffusing fine particles which may be incorporated into either the intermediate layer or the surface layers. The light-diffusing fine particles may be inorganic fine particles or organic fine particles. Examples of the inorganic fine particles include, but not limited to, fine particles of calcium carbonate, barium sulfate and glass beads. Examples of the organic fine particles include, but not limited to, fine particles of crosslinked styrene polymer, crosslinked MMA polymer, and crosslinked styrene-MMA copolymer.

The plastic substrate may be produced by a known co-extrusion method.

The Fresnel lens sheet is produced, for example, by applying an ultraviolet curable resin onto a surface of the plastic substrate, pressing a metal or resin mold having a shape matching with the contour of the Fresnel lens surface against the applied ultraviolet curable resin, and irradiating ultraviolet light from the opposite side to cure the ultraviolet curable resin into the Fresnel lens shape. The total thickness of the Fresnel lens sheet is preferably from 1.0 to 4.0 mm, and the thickness the lens portion made of the ultraviolet cured resin is preferably about 100 μm.

The lenticular lens sheet includes a plastic substrate and cylindrical lenses which are arranged in parallel on at least one surface of the plastic substrate, and diffuse lights in a horizontal direction or in a vertical direction.

The lenticular lens sheet of the invention is produced, for example, by a method in which lenticular lenses are formed on the surface of the plastic substrate upon its production by extrusion using a metal roll having a surface shape matching with the contour of the lenticular lenses, or a method in which a lenticular lens film is laminated to the surface of the plastic substrate. The lenticular lens film is produced, for example, by bonding a lenticular lens to polyethylene terephthalate film, etc. by a method described in JP 11-288084A, etc.

The total thickness of the lenticular lens sheet is preferably about from 0.5 to 2.0 mm, and the thickness of the lens portion is preferably about 100 μm.

Common rear projection screens include, at least, a Fresnel lens sheet, a lenticular lens sheet and a front panel. The front panel is used for protecting the lenticular lens sheet, and is generally made of a hard-coated plastic sheet.

By replacing both or either of the Fresnel lens sheet and the lenticular lens sheet of known rear projection screens with the lens sheet(s) of the invention, the rear projection screens of the invention are obtained. By using the rear projection screens of the invention, rear projection television sets reproducing good images are provided.

The present invention will be described in more detail by referring to the following examples.

The Fresnel lens sheet and the lenticular lens sheet were evaluated by the following methods.

(1) Degree of Warp or Deflection of Fresnel Lens Sheet

A plastic sheet of 2.0 mm thick made of MMA-styrene copolymer resin A (60% by weight of MMA and 40% by weight of styrene) was used as a lenticular lens sheet and a front panel.

From a commercially available rear projection television set, a rear projection screen mounted therein was taken out. Then, the Fresnel lens sheet obtained in the following examples or comparative examples, the lenticular lens sheet and the front panel were stacked in this order from the light source side and fixed in the rear projection television set.

Figure 3:
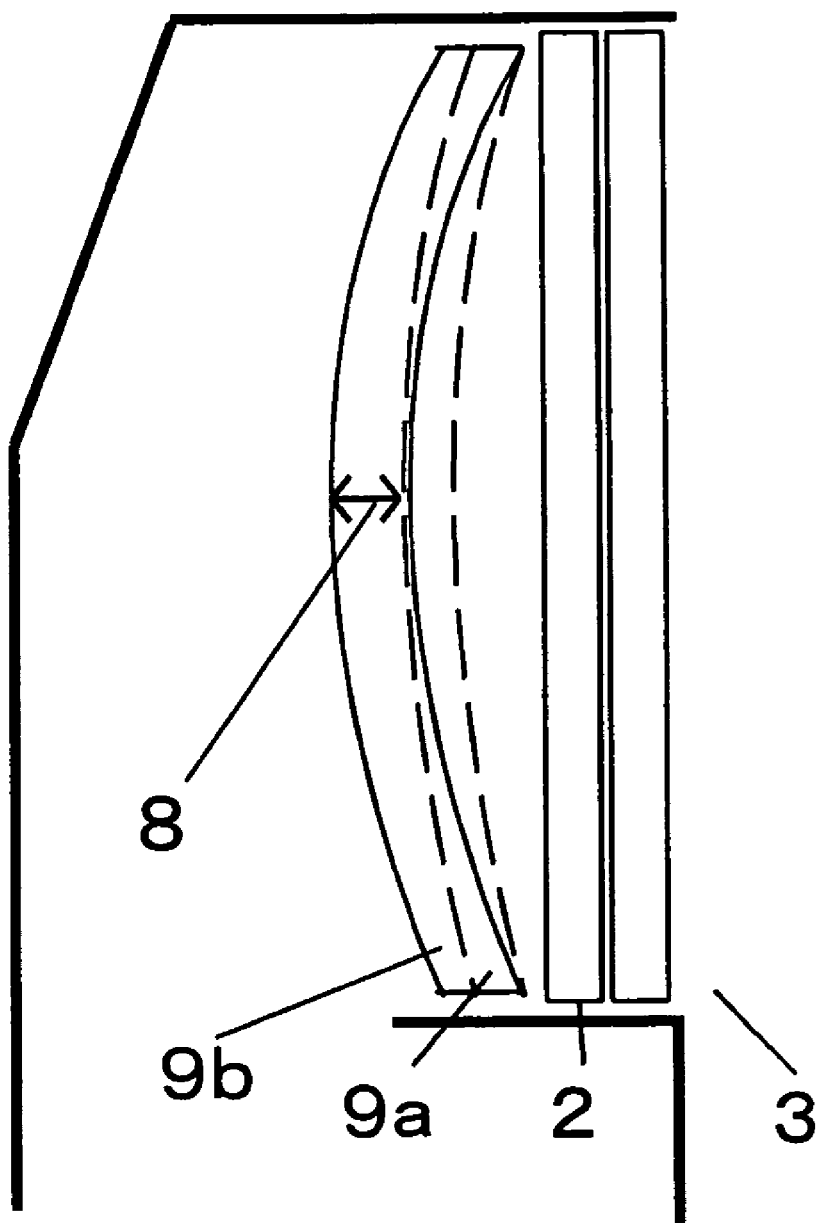
FIG. 3 is a schematic view showing the measuring position for evaluating the degree of warp or deflection of a lens sheet.

The ambient temperature and humidity around the rear projection television set were varied every 24 hours to measure the horizontal displacement 8 (mm) of the central position of the Fresnel lens sheet between the initial position 9a immediately after mounting and the measuring position 9b (FIG. 3). The displacement toward the watcher side was represented by plus values and the displacement toward the light source side was represented by minus values.

(2) Degree of Warp or Deflection of Lenticular Lens Sheet

A plastic sheet of 2.0 mm thick made of MMA-styrene copolymer resin A (60% by weight of MMA and 40% by weight of styrene) was used as a Fresnel lens sheet and a front panel.

From a commercially available rear projection television set, a rear projection screen mounted therein was taken out. Then, the Fresnel lens sheet, the lenticular lens sheet obtained in the following example and the front panel were stacked in this order from the light source side and fixed in the rear projection television set.

The ambient temperature and humidity around the rear projection television set were varied every 24 hours. The horizontal displacement (mm) of the central position of the lenticular lens sheet was measured in the same manner as in the measurement of the degree of warp or deflection of Fresnel lens sheet. The displacement toward the watcher side was represented by plus values and the displacement toward the light source side was represented by minus values.

(3) Adhesion Strength

The adhesion strength between the surface layer of plastic substrate and the ultraviolet cured resin was evaluated by a peel test. The results were expressed by relative peel strengths while taking the peel strength to MMA-styrene styrene copolymer resin A (60% by weight of MMA and 40% by weight of styrene) as 100.

Peel test conditions.
  Measuring apparatus: "Autograph EZ-TEST" available from Shimadzu Corporation.
  Measuring temperature: 23° C.
  Measuring humidity: 50% RH
  Measuring speed: 50 mm/min
  Measuring width: 20 mm
  Peel angle: 90°

EXAMPLE 1

A two-kind, three-layered plastic substrate 1 composed of an intermediate layer made of a mixture of 100 parts by weight of MMA-styrene copolymer resin C (MMA/styrene=20/80 by weight; weight-average molecular weight: 150,000; saturated water absorptivity: 0.2% by weight) and 0.5 part by weight of light-diffusing fine particles (crosslinked styrene-MMA copolymer; average particle size: 12 μm; refractive index: 1.55) and surface layers each made of MMA-styrene copolymer resin A ((MMA/styrene=60/40 by weight; weight-average molecular weight: 150,000; saturated water absorptivity: 0.8% by weight) was produced by a co-extrusion method. The total thickness was 2.0 mm, the thickness of each surface layer was about 0.1 mm and the thickness of the intermediate layer was about 1.8 mm. An ultraviolet curable resin was applied onto the plastic substrate 1. Then, a resin mold having a shape matching with the contour of Fresnel lens surface was pressed against the applied ultraviolet curable resin. By irradiating ultraviolet light from the opposite side, the ultraviolet curable resin was cured into a shape of the Fresnel lens, to produce a Fresnel lens sheet 1. The thickness of the lens portion made of the ultraviolet cured resin was approximately 100 μm. The degree of warp or deflection and the adhesion strength of the Fresnel lens sheet 1 as measured by the methods described above are shown in Tables 1 and 2.

EXAMPLE 2

A two-kind, three-layered plastic substrate 2 composed of an intermediate layer made of a mixture of 100 parts by weight of MMA-styrene copolymer resin C (MMA/styrene=20/80 by weight) and 0.2 part by weight of barium sulfate and surface layers each made of MMA-styrene copolymer resin A ((MMA/styrene=60/40 by weight) was produced by a co-extrusion method. The total thickness was 2.0 mm, the thickness of each surface layer was about 0.05 mm and the thickness of the intermediate layer was about 1.9 mm. Using the plastic substrate 2, a Fresnel lens sheet 2 was produced in the same manner as in Example 1. The degree of warp or deflection and the adhesion strength of the Fresnel lens sheet 2 as measured by the methods described above are shown in Tables 1 and 2.

EXAMPLE 3

A two-kind, three-layered plastic substrate 3 composed of an intermediate layer made of a mixture of 100 parts by weight of MMA-styrene copolymer resin C (MMA/styrene=20/80 by weight) and 1 part by weight of light-diffusing fine particles (crosslinked styrene-MMA copolymer; average particle size: 12 μm; refractive index: 1.55) and surface layers each made of MMA-styrene copolymer resin A ((MMA/styrene=60/40 by weight) was produced by a co-extrusion method. The total thickness was 2.0 mm, the thickness of each surface layer was about 0.05 mm and the thickness of the intermediate layer was about 1.9 mm. By bonding a lenticular lens film (polyethylene terephthalate film having lenticular lenses bonded) to the plastic substrate 3, a lenticular lens sheet 1 was produced. The degree of warp or deflection of the lenticular lens sheet 1 is shown in Table 1.

Comparative Example 1

A single-layered plastic substrate 4 made of a mixture of 100 parts by weight of MMA-styrene copolymer resin A ((MMA/styrene=60/40 by weight) and 0.1 part by weight of barium sulfate was produced by a co-extrusion method. The total thickness was 2.0 mm. Using the plastic substrate 4, a Fresnel lens sheet 3 was produced in the same manner as in Example 1. The degree of warp or deflection and the adhesion strength of the Fresnel lens sheet 3 are shown in Tables 1 and 2.

Comparative Example 2

A single-layered plastic substrate 5 made of a mixture of 100 parts by weight of MMA-styrene copolymer resin C (MMA/styrene=20/80 by weight) and 0.1 part by weight of barium sulfate was produced by a co-extrusion method. The total thickness was 2.0 mm. Using the plastic substrate 5, a Fresnel lens sheet 4 was produced in the same manner as in Example 1. The degree of warp or deflection and the adhesion strength of the Fresnel lens sheet 4 are shown in Tables 1 and 2.

Comparative Example 3

A two-kind, three-layered plastic substrate 6 composed of an intermediate layer made of a mixture of 100 parts by weight of MMA-styrene copolymer resin A (MMA styrene=60/40 by weight; weight-average molecular weight: 150,000; saturated water absorptivity: 0.8% by weight) and 1 part by weight of light-diffusing fine particles (crosslinked styrene-MMA copolymer; average particle size: 12 μm; refractive index: 1.55) and surface layers each made of MMA-styrene copolymer resin B ((MMAlstyrene=30/70 by weight: saturated water absorptivity: 0.3% by weight) was produced by a co-extrusion method. The total thickness was 2.0 mm, the thickness of each surface layer was about 0.1 mm and the thickness of the intermediate layer was about 1.8 mm. Using the plastic substrate 6, a Fresnel lens sheet 5 produced in the same manner as in Example 1. The degree of wrap or deflection and the adhesion strength of the Fresnel lens sheet 5 are shown in Tables 1 and 2.

TABLE 1

| | Degree of warp or deflection (mm) | | | |
|---|---|---|---|---|
| | 25° C. 35% RH | 40° C. 95% RH | 25° C. 50% RH | 40° C. 13% RH |
| Examples | | | | |
| 1 | +1.5 | +1.0 | +4.0 | +5.0 |
| 2 | +0.5 | +2.0 | +2.0 | +4.0 |
| 3 | +1.0 | +2.0 | +3.5 | +5.5 |
| Comparative Examples | | | | |
| 1 | +1.0 | +6.0 | +6.0 | −19.0 |
| 2 | +0.0 | +1.5 | +1.0 | +1.0 |
| 3 | +0.5 | +2.0 | +1.5 | +3.5 |

TABLE 2

| | Adhesion Strength |
|---|---|
| Examples | |
| 1 | 86 (good) |
| 2 | 86 (good) |
| Comparative Examples | |
| 1 | 100 (good) |
| 2 | 11 (poor) |
| 3 | 10 (poor) |

As described above, the adhesive strength between the substrate and the ultraviolet cured resin is improved, and simultaneously, the warp or deflection of lens sheet such as Fresnel lens sheet and lenticular lens sheet is effectively reduced by forming the substrate of lens sheet from the plastic substrate having an intermediate layer made of a low water-absorptive resin and first and second surface layers each made of a resin having a relatively high polarity and water absorptivity.

By forming the intermediate layer from the low water-absorptive resin, the water absorptivity of whole plastic substrate is reduced. This is because that the intermediate layer is thicker than the surface layers, and so, the water absorptivity of whole plastic substrate is governed by the water absorptivity of the intermediate layer. Since the surface layers are made of a high water-absorptive resin, i.e., a high polarity resin, the adhesion strength between the plastic substrate and the ultraviolet cured resin which forms lens portion is sufficient for practical use. By making the plastic substrate symmetrical with respect to the layer structure, the warp or deflection during transportation is also reduced.

A rear projection screen having at least one lens sheet of the invention provides rear projection television sets which reproduce good images irrespective of the humidity change of surrounding atmosphere.

What is claimed is:

1. A lens sheet comprising a plastic substrate and a lens element on the plastic substrate, wherein the plastic substrate comprises a first surface layer, an intermediate layer and a second surface layer, wherein a saturated water absorptivity of a resin which constitutes the intermediate layer less than 0.4% by weight, and a saturated water absorotivity of a resin which constitutes each of the first surface layer and the second surface layer is 0.4% by weight or more, and wherein a thickness of the intermediate layer is greater than that of the first and second surface layers.

2. The lens sheet according to claim 1, wherein the lens element is a Fresnel lens.

3. The lens sheet according to claim 2, wherein the intermediate layer is made of methyl methacrylate-styrene copolymer resin comprising 10 to 30% by weight of methyl methacrylate and 90-70% by weight styrene, and each of the first and second surface layers is made of methyl methacrylate-styrene copolymer comprising 60 to 80% by weight of methyl methacrylate and 40 to 20% by weight of styrene.

4. The lens sheet according to claim 1, wherein the lens element is a lenticular lens.

5. The lens sheet according to claim 1, wherein the saturated water absorptivity of the intermediate layer is lower than that of each of the first surface layer and the second surface layer by 0.05% by weight or more.

6. The lens sheet according to claim 5, wherein said saturated water absorptivity of the intermediate layer is lower than that of each of the first and second surface layers by 0.05%-0.5% by weight.

7. The lens sheet according to claim 1, wherein the intermediate layer is made of methyl methacrylate-styrene copolymer resin comprising from 10 to 35% of weight of methyl methacrylate and from 90 to 65% by weight of styrene, acrylonitrile-styrene copolymer resin comprising from 10 to 20% by weight of acrylonitrile and from 90 to 80% by weight of styrene or polycarbonate; and each of the first surface layer and the second surface layer is made of methyl methacrylate-styrene copolymer resin comprising from 40 to 90% by weight of methyl methacrylate and from 60 to 10% by weight of styrene, acrylonitrile-styrene copolymer resin comprising from 25 to 50% by weight of acrylonitrile and from 75 to 50% by weight of styrene or polymethyl methacrylate.

8. The lens sheet according to claim 1, wherein the intermediate layer is made of methyl methacrylate-styrene copolymer resin comprising from 10 to 35% by weight of methyl methacrylate and from 90 to 65% by weight of styrene, and each of the first surface layer and the second surface layer is made of methyl methacrylate-styrene copolymer resin comprising from 40 to 90% by weight of methyl methacrylate and from 60 to 10% by weight of styrene.

9. The lens sheet according to claim 1, wherein at least one layer selected from the group consisting of the intermediate layer, the first surface layer and the second surface layer further contains inorganic fine particles or organic fine particles.

10. The lens sheets according to claim 9, wherein the inorganic fine particles are particles of at least one substance selected from the group consisting of calcium carbonate, barium sulfate and glass beads.

11. The lens sheet according to claim 9, wherein the organic fine particles are particles of at least one substance selected from the group consisting of crosslinked styrene polymers, crosslinked methyl methacrylate polymers and crosslinked methyl methacrylate-styrene copolymers.

12. The lens sheet according to claim 1, wherein a thickness of each of the first surface layer and the second surface layer is from 50 to 300 μm, and a total thickness of the plastic substrate is from 1.0 to 4.0 mm.

13. A rear projection screen comprising a combination of a Fresnel lens sheet and a lenticular lens sheet, wherein at least one of the Fresnel lens sheet or the lenticular lens sheet is made of the lens sheet as defined in claim 1.

14. The lens sheet according to claim 1, wherein the first and second surface layers are made of the same resin and have substantially the same saturated water absorptivity.

15. The lens sheet according to claim 1, wherein the first and second surface layers have a same thickness.

* * * * *